United States Patent [19]
Falleroni et al.

[11] Patent Number: 6,094,942
[45] Date of Patent: *Aug. 1, 2000

[54] METHOD AND APPARATUS FOR REDUCING TIN DEFECTS IN FLOAT GLASS

[75] Inventors: Charlene A. Falleroni, Lower Burrell; Donald L. DeSantis, Hollidaysburg; Kevin G. Hill, New Kensington, all of Pa.

[73] Assignee: PPG Industries Ohio, Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/874,529

[22] Filed: Jun. 13, 1997

[51] Int. Cl.⁷ .......................... C03B 13/00; C03B 15/00; C03B 17/00; C03B 5/16
[52] U.S. Cl. .......................... 65/99.2; 65/99.4; 65/182.3; 65/355; 65/356; 65/134.5; 65/374.15
[58] Field of Search ..................... 65/99.2, 99.4, 65/182.3, 355, 356, 374.15, 134.5

[56] References Cited

U.S. PATENT DOCUMENTS

| | | |
|---|---|---|
| 2,689,982 | 9/1954 | Chynoweth . |
| 3,219,427 | 11/1965 | Hymowitz . |
| 3,305,340 | 2/1967 | Atkeson . |
| 3,337,319 | 8/1967 | Edwards . |
| 3,337,320 | 8/1967 | Dyck . |
| 3,337,322 | 8/1967 | Taylor .......................... 65/32 |
| 3,356,476 | 12/1967 | Gulotta .......................... 65/27 |
| 3,414,396 | 12/1968 | Brichard . |
| 3,480,420 | 11/1969 | Loukes et al. .............. 65/27 |
| 3,517,726 | 6/1970 | Mills et al. . |
| 3,525,601 | 8/1970 | Ohsato .......................... 65/168 |
| 3,539,320 | 11/1970 | Plumat et al. . |
| 3,595,635 | 7/1971 | Nixon .......................... 65/157 |
| 3,597,178 | 8/1971 | Tilton .......................... 65/27 |
| 3,615,316 | 10/1971 | Kita . |
| 3,622,300 | 11/1971 | Javaux . |
| 3,625,668 | 12/1971 | Greenler . |
| 3,795,500 | 3/1974 | Murphy . |
| 3,798,016 | 3/1974 | Ormesher et al. .......... 65/99 A |
| 3,970,442 | 7/1976 | Gulotta .......................... 65/32 |
| 3,977,858 | 8/1976 | Taguchi . |
| 4,115,091 | 9/1978 | Bourggraff et al. . |
| 4,354,866 | 10/1982 | Mouly .......................... 65/99.5 |
| 5,059,232 | 10/1991 | Kurashina et al. .......... 65/99.2 |

FOREIGN PATENT DOCUMENTS

| | | |
|---|---|---|
| 1323711 | 3/1963 | France . |
| 1579113 | 8/1969 | France . |
| 1580547 | 9/1969 | France . |
| 1582471 | 9/1969 | France . |
| 53811 | 6/1967 | Luxembourg . |

Primary Examiner—Stanley S. Silverman
Assistant Examiner—Jacqueline A. Ruller
Attorney, Agent, or Firm—Kenneth J. Stachel; Andrew C. Siminerio

[57] ABSTRACT

The present invention provides a method of reducing tin defects in flat glass made by the float process. In the float process, molten glass is delivered onto a pool of molten tin within an enclosed chamber and formed into a glass ribbon. Oxygen gas dissolved in the molten tin combines with the tin to form tin oxide which vaporizes and collects within the chamber, resulting in defects in the glass. In the present invention, hydrogen gas is introduced directly into the molten tin to react with the oxygen gas and tin oxide within the molten tin to form water and elemental tin, resulting in a reduction in the amount of tin oxide within the molten tin. In one particular embodiment of the invention, the hydrogen gas is introduced into the molten tin through an elongated, porous graphite member submerged in the molten tin within the forming chamber such that it extends along and is located outboard of selected portions of the edge of the glass ribbon.

23 Claims, 2 Drawing Sheets

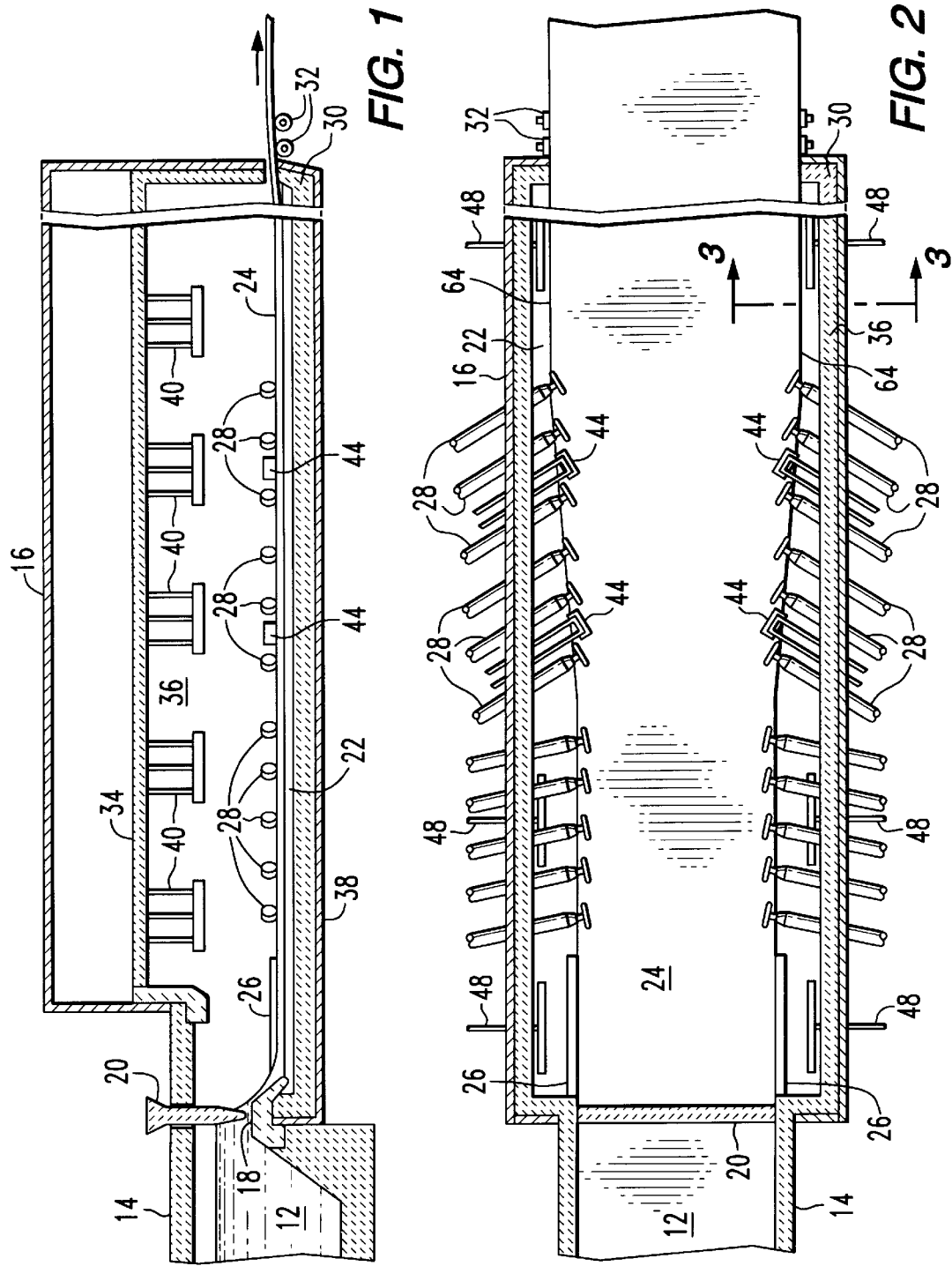

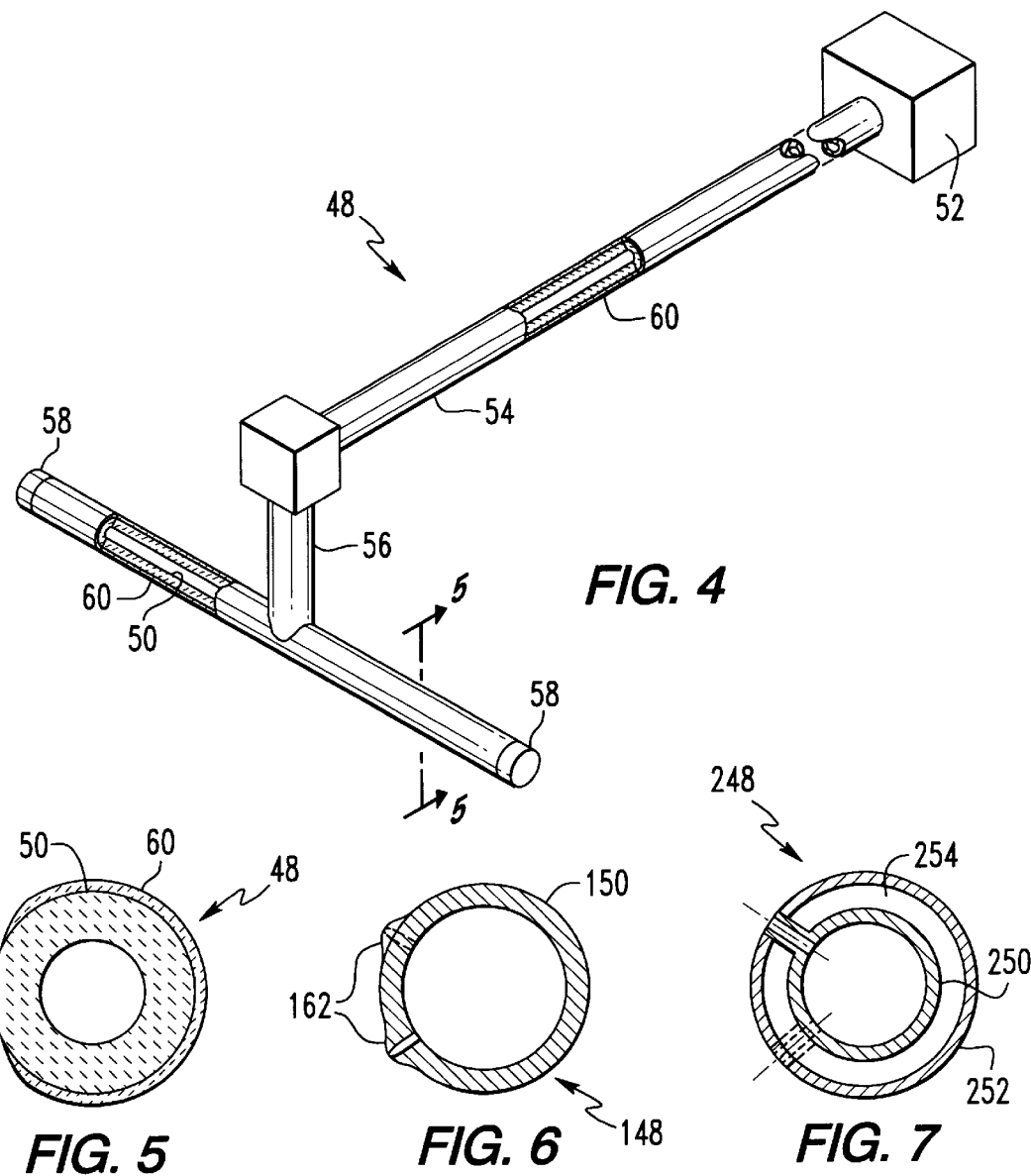
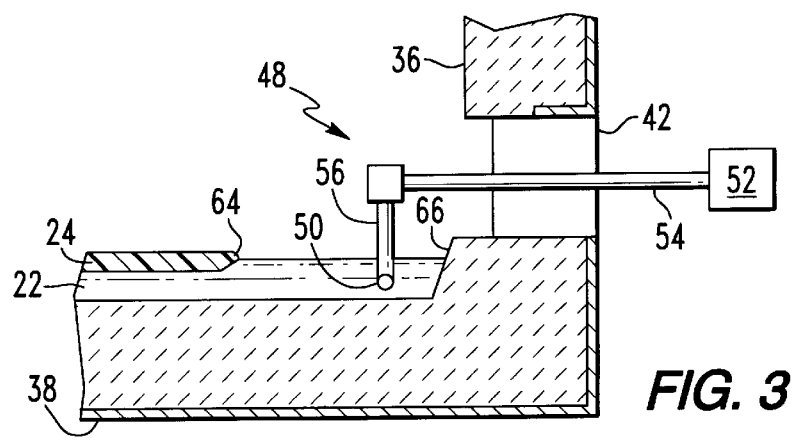

METHOD AND APPARATUS FOR REDUCING TIN DEFECTS IN FLOAT GLASS

BACKGROUND OF THE INVENTION

Field of the Invention

This invention relates to a method and apparatus for reducing defects in flat glass, and in particular to reducing tin defects in glass made by the float process. 2. Technical Considerations In forming flat glass using the process known as the "float process", molten glass is delivered onto a pool of molten metal in a float forming chamber and attenuated to form a ribbon of desired thickness. Glass entering the float forming chamber is initially at a relatively high temperature, for example around 2000° F. (1100° C.), so as to be relatively fluid. During its passage through the float chamber, the glass is cooled to a condition suitable for engagement with attenuating devices, for example to a temperature around 1400–1700° F. (760–930° C.), and subsequently cooled further to a dimensionally stable condition so that it may be withdrawn from the forming chamber, typically to a temperature about 1100° F. (600° C.). The molten metal, usually molten tin or an alloy thereof, and the atmosphere within the forming chamber are generally at a temperature lower than the glass temperature and thus considerable cooling of the glass takes place naturally by losing heat to the surroundings in the forming chamber.

Processing the glass ribbon by the float process presents several problems which may result in tin defects on the upper and lower surfaces of the glass ribbon. More specifically, molten tin in the float forming chamber reacts readily with oxygen within the forming chamber atmosphere or dissolved in the molten tin, forming tin oxide which vaporizes, collects in the forming chamber atmosphere and condenses on cooler portions of the forming chamber roof structure. It is well known to use a protective atmosphere, generally a mixture of nitrogen and hydrogen, in the float forming chamber to prevent oxidation and contamination of the molten tin. Depending on the operating conditions within the forming chamber, the hydrogen will react with the condensed tin oxide to form water vapor and elemental tin, which, in turn, may drop from the roof structure onto the surface of the hot glass ribbon, forming a defect. In addition to tin oxide formation during the manufacture of flat glass by the float process, molten tin will react with sulfur in the tin and form tin sulfide which also vaporizes, collects within the forming chamber and condenses on cooler parts of the forming chamber's roof structure. The tin sulfide may also be reduced by hydrogen, producing hydrogen sulfide and elemental tin which, in turn, may drop from the roof onto the glass ribbon.

It would be advantageous to reduce the formation of tin oxide in the float forming chamber so as to reduce the number of tin related defects, as well as to keep hydrogen out of the forming chamber atmosphere to reduce defects resulting from the formation of tin sulfide. In addition, it is believed that the reduction of oxygen in the molten tin will reduce diffusion of ionic tin into the bottom surface of the glass ribbon along the glass/molten tin interface. This ionic tin diffusion may lead to bloom, which is the term used for surface wrinkling of flat glass when it is heated and shaped, and the formation of calcium carbonate deposits on the lower surface of the glass ribbon.

SUMMARY OF THE INVENTION

The present invention provides a method of reducing tin defects in flat glass made by the float process. In the float process, molten glass is delivered onto a pool of molten tin within an enclosed chamber and formed into a glass ribbon. Oxygen gas dissolved in the molten tin combines with the tin to form tin oxide which vaporizes and collects within the chamber, resulting in defects in the glass. In the present invention, hydrogen gas is introduced directly into the molten tin to react with the oxygen gas and tin oxide within the molten tin to form water and elemental tin, resulting in a reduction in the amount of tin oxide within the molten tin. In one particular embodiment of the invention, the hydrogen gas is introduced into the molten tin through an elongated, porous graphite member submerged in the molten tin within the forming chamber such that it extends along and is located outboard of selected portions of the edge of the glass ribbon.

BRIEF DESCRIPTION OF THE DRAWINGS

FIG. 1 is a schematic longitudinal cross sectional view of a float glass forming chamber.

FIG. 2 is a plan view of the forming chamber shown in FIG. 1, incorporating features of the present invention.

FIG. 3 is a view taken along line 3—3 of FIG. 2.

FIG. 4 is a cut-away perspective view of a gas manifold, incorporating features of the present invention.

FIG. 5 is a sectional view taken along line 5—5 of FIG. 4.

FIGS. 6 and 7 are views similar to FIG. 5 of alternate embodiments of the invention.

DETAILED DESCRIPTION OF THE INVENTION

The particular float forming chamber structure described herein is a type particularly suited to the preferred embodiment of the present invention. However, it should be understood that other types of forming chamber structures may be employed with the present invention.

In the arrangement shown in FIGS. 1 and 2, molten glass 12 contained in a melting furnace 14 is metered into a float forming chamber 16 between a threshold 18 and a vertically adjustable tweel 20, e.g. as disclosed in U.S. Pat. No. 4,354,866. Within the forming chamber 16, the molten glass is supported by a pool of molten metal 22, usually tin, and forms a glass ribbon 24 between side barriers 26. After the ribbon 24 has been attenuated to a desired thickness and width by edge roll machines 28 positioned along a portion of the forming chamber 16, the ribbon 24 is withdrawn from the forming chamber 16 through an exit opening 30 where it is lifted from the molten metal 22 by lift-out roll 32.

The forming chamber 16 includes a roof 34, side walls 36 and refractory basin 38 of conventional construction well known in the art. Electrical resistance heating elements 40 are positioned along roof 34 of the forming chamber 16. The side walls 36 are spaced above the basin 38 to provide an access opening which is plugged by side seals 42 as shown in FIG. 3. The edge roll machines 28 and conventional prior art edge coolers 44 are inserted through side seals 42 into the forming chamber 16. The molten metal 22 is contained within the refractory basin 38.

In the present invention, hydrogen gas is introduced directly into the molten tin, preferably within the forming chamber, to reduce formation of tin oxide vapor. More specifically, the hydrogen gas in the tin will reduce the oxygen in the molten tin to form water, thus preventing formation of tin oxide. In addition, the hydrogen gas will react with tin oxide already formed in the molten tin to form water and elemental tin, thus preventing the tin oxide from vaporizing and leaving the molten tin. The reduction of oxygen in the molten tin will also reduce the amount of ionic tin diffusion into the lower surface of the glass ribbon.

Referring to FIG. 2, a plurality of manifolds 48 are used to introduce hydrogen gas directly into the molten tin 22. Although not limiting in the present invention, FIGS. 3, 4 and 5 illustrate a particular embodiment of manifold 48. More specifically, manifold 48 includes a delivery tube 50 which is supplied with hydrogen gas from a pressurized gas source 52 through a feeder pipe 54 and connector 56. The delivery tube 50 should be fabricated from a material that can withstand extended submersion in molten tin. In one particular embodiment of the invention, delivery tube 50 is constructed from a porous material. The interconnected openings within the porous material function as outlets or channels which direct the hydrogen gas through the wall of the delivery tube 50 and into the molten tin 22. It has been found that medium grain graphite rod with a center bore hole may be used for the delivery tube 50. If necessary, the ends of the delivery tube 50 may be provided with end caps 58 to seal the tube 50. Although not required, the feeder pipe 54 and connector 56 may also be fabricated from the same graphite material.

In an embodiment of the invention where the feeder pipe 54 and connector 56 are fabricated from a porous material, their outer surface, as well as all connecting joints, should be coated with a sealant 60, as shown in FIG. 3, to prevent hydrogen gas from diffusing through the walls of these components and prevent oxidation of the manifold components. It is preferred that the sealant 60 be a material that is easily applied and is capable of withstanding high temperatures.

Although the manifold 48 as discussed above is fabricated from graphite, it is anticipated that other materials may be used. For example, the delivery tube, feeder pipe and/or connector may be constructed from stainless steel, molybdenum, or other high temperature resistant metal alloy, with the delivery tube 150 of manifold 148 further including a plurality of nozzles or outlets 162, as shown in FIG. 6, which provide a passage through the wall of the delivery tube 150 through which the hydrogen gas is delivered into the molten tin. If desired, portions of the components of the manifold 148 may be provided with a coating (not shown in FIG. 6) to protect the manifold 148 against corrosion while submerged within the molten tin 22. As an alternative, the manifold may be cooled by circulating coolant along the delivery tube and/or components of the manifold in a manner well known in the art. Although not limiting in the present invention, FIG. 7 illustrates a delivery tube 250 of a manifold 248 which extends through a cooling jacket 252. Coolant, e.g. water, is circulated in the space 254 between the delivery tube 250 and jacket 252 to remove heat from the manifold 248.

In one particular embodiment of the invention, delivery tube 50, feeder pipe 54 and connector 56 are fabricated from Grade HLM extruded graphite available from Sigri Great Lakes Carbon Corporation, Morgantown, N.C. This graphite has a maximum grain size of 0.03 inches (0.8 mm), a density of 107 pounds per cubic foot (1.71 grams per cubic cm) and has a total porosity of about 24 percent. Delivery tube 50 has a 1 inch (2.54 cm) outer diameter and a 0.5 inch (1.27 cm) inner diameter and feeder pipe 54 and connector 60 have a 1.25 inch (3.18 cm) outer diameter and 0.5 inch inner diameter. Sealant 60 is Coverguard coating available from ZYP Coatings, Inc., Oakridge, Tenn., which is a silicon carbide coating capable of withstanding temperatures in excess of 1800° F. (982° C.). In this particular embodiment, the sealant 60 has a thickness of about 5 mils and it is preferred that the coating be about 4–8 mils thick. If desired, a portion of the surface of delivery tube 50 may be covered by the coating 60 in order to control the flow of hydrogen gas into the molten tin while avoiding any disturbance to the molten tin. In particular, it is desirable to concentrate the delivery of hydrogen gas from the delivery tube 50 away from the glass ribbon 24 to avoid trapping hydrogen gas beneath the glass ribbon 24. Although not limiting in the present invention, in the particular embodiment illustrated in FIG. 5, sealant 60 is also applied to the entire surface of delivery tube 50, except for section 62 which comprises approximately one-sixth of the tube's circumference. It has been found that hydrogen gas will diffuse through this manifold configuration and construction and form a maximum bubble diameter of about 0.125 inches (0.32 cm) when supplied with hydrogen gas at a feed rate of about 0.5 standard cubic foot per hour (0.0142 standard cubic meters per hour). In other embodiments of the invention, as much as half the surface of the delivery tube 50 remained uncoated.

During testing, two manifolds 48 having a 36 inch (0.91 m) long delivery tube 50 were inserted through the side seals 42 and positioned outboard of and generally parallel to opposing edges 64 of the glass ribbon 24 in the upstream end of the forming chamber 16. The manifolds 48 were also upstream of the edge roll machines 28. Each delivery tube 50 was completely submerged in the molten tin 22 immediately adjacent wall portion 66 of the refractory basin 38. Although not required, it is preferred that the delivery tube 50 not be positioned below the ribbon 24 so as to avoid any possible build up of hydrogen gas bubbles beneath the ribbon 24. Pure hydrogen gas was delivered through the manifold 48 at a rate of approximately 0.5 standard cubic foot per hour (0.0142 standard cubic meters per hour). It was found that a greater delivery rate for this particular embodiment of manifold 48 created turbulence in the molten tin 22.

To test the effectiveness of the manifolds 48 in reducing the amount of oxygen in the molten tin 22, an oxygen probe was positioned immediately upstream from the manifolds 48 to measure the amount of oxygen in the molten tin 22. Over a 24 hour period, the amount of oxygen in the molten tin dropped from about 40 parts per million (ppm) to about 2 ppm.

In production, it is anticipated that the manifolds 48 would be larger and would be positioned at selected locations with the float forming chamber 16. FIG. 2 illustrates manifolds 48 positioned both upstream and downstream of the edge roll machines 28 as well as within the same general area. If required, manifolds 48 may extend the entire length of the float bath chamber 16 along both sides of the ribbon 24. Depending on the size of the float forming chamber 16 and the rate at which molten glass is delivered and formed within the chamber, it is expected that in order to minimize the production of tin oxide in the molten tin, hydrogen gas should be introduced into the molten tin at a rate of about 3 to 20 standard cubic feet of hydrogen gas per ton of molten tin per hour (0.094 to 0.624 standard cubic meters per metric ton per hour), preferably about 4 to 10 standard cubic feet of hydrogen gas per ton of molten tin per hour (0.125 to 0.312 standard cubic meters per metric ton per hour). For example, in a particular float forming chamber 16 which contains about 200 tons (181 metric tons) of molten tin, produces about 425 to 475 tons (385 to 431 metric tons) of glass per day and delivers approximately 1000 standard cubic feet (28.3 standard cubic meters) of hydrogen gas per hour into the float forming chamber atmosphere, it is expected that this hydrogen gas may be replaced with an equal amount of hydrogen gas introduced directly into the molten tin of the chamber to control tin defects as discussed above.

The present invention reduces the number and type of defects in flat glass produced by the float process by introducing hydrogen gas directly into the molten tin so as to inhibit the formation of tin oxide and reduce diffusion of ionic tin into the glass surface. In addition, by introducing the hydrogen gas directly into the molten tin rather than introducing it into the float chamber atmosphere, there is no reaction between the hydrogen and tin sulfide condensate on the chamber roof, which may further reduce tin defects in the flat glass.

The invention described and illustrated herein represents a description of illustrative preferred embodiments thereof. It is understood that various changes may be made without departing from the gist of the invention defined in the claims as follows.

What is claimed is:

1. In a method of making a flat glass ribbon by a float process wherein molten glass is delivered onto a pool of molten metal containing tin within an enclosed chamber and formed into a glass ribbon, the glass ribbon having opposed edges as it moves through the chamber in a predetermined direction with the edges of the ribbon spaced from walls of the enclosed chamber such that the space between the edge of the ribbon and the adjacent wall of the chamber defines an uncovered portion of the pool of molten metal, wherein oxygen gas dissolved in the pool of molten metal combines with the tin in the pool of molten metal to form tin oxide which vaporizes and collects within the chamber above the molten glass and glass ribbon resulting in defects in the glass ribbon, the improvement comprising:

positioning an elongated member having porous and nonporous portions, a longitudinal axis and an elongated hollow passageway extending through the elongated member and along the longitudinal axis in the pool of molten metal within the enclosed chamber such that the longitudinal axis of the elongated member generally parallels an adjacent edge of the glass ribbon and extends along the predetermined direction of the glass ribbon, wherein the porous portions permits gas passing into the passageway to flow into the pool of molten metal through the porous portions and the non-porous portions prevent gas passing into the passageway from flowing into the pool of molten metal; and moving hydrogen gas through the passageway and the porous portions of the elongated member directly into the pool of molten metal to react the hydrogen with the tin oxide within the pool of molten metal to form water and elemental tin to reduce the amount of tin oxide within the pool of molten metal.

2. The method of claim 1 wherein hydrogen gas moves into the pool of molten metal at a rate of about 3 to 20 standard cubic feet of hydrogen gas per hour per ton of molten tin in the pool of molten metal.

3. The method of claim 2 wherein hydrogen gas moves into the pool of molten metal at a rate of about 4 to 10 standard cubic feet of hydrogen gas per hour per ton of molten tin in the pool of molten metal.

4. The method of claim 1 further including a step of cooling the elongated member.

5. The method of claim 1 wherein said positioning step includes a step of placing the elongated member in the pool of molten metal at a location outboard of an edge of the glass ribbon in the uncovered portion of the pool of molten metal.

6. The method of claim 5 wherein said placing step is practiced on each side of the enclosed chamber and further includes a step of repeating said positioning step to provide a plurality of elongated members in spaced relationship to one another along each side of the glass ribbon and extending along at least selected portions of the edges of the glass ribbon.

7. The method of claim 1 wherein the elongated member is an elongated graphite member.

8. In a method of making flat glass by a float process wherein molten glass is delivered onto a pool of molten metal containing tin within an enclosed chamber and formed into glass ribbon and oxygen gas dissolved in the pool of molten metal combines with the tin to form tin oxide which vaporizes and collects within the chamber resulting in defects in the glass ribbon, the improvement comprising:

positioning an elongated porous graphite member in the pool of molten metal, such that it extends along at least selected portions of the edge of the glass ribbon;

wherein a non-porous, heat resistant coating is on selected portions of the graphite member; and delivering hydrogen gas directly to the pool of molten metal through the porous graphite member to react the hydrogen within the oxygen gas and tin oxide with the pool of molten metal to form water and elemental tin resulting in a reduction in the amount of tin oxide within the pool of molten metal.

9. The method of claim 1 wherein the hydrogen gas is introduced into the pool of molten metal at a rate such that the hydrogen gas forms bubbles up to about 0.125 inches in diameter.

10. A gas delivery apparatus for delivering gas within a pool of molten metal containing tin, that supports a glass ribbon, comprising:

an elongated, heat resistant delivery member for submersion in the molten metal pool having a bore extending along at least a portion of said delivery member, and a non-porous heat resistant coating applied to selected portions of said delivery member;

a plurality of outlets through said delivery member to provide passages from said bore through the outlets of said delivery member so that with the delivery member positioned with the bore generally parallel to the glass ribbon gas flow from the outlets is controlled to avoid trapping gas beneath the glass ribbon;

means to provide for connection of said delivery member to a gas source; and a gas supply source.

11. A gas delivery apparatus for delivering gas within molten tin, comprising;

an elongated, heat resistant delivery member having a bore extending along at least a portion of said delivery member, said delivery member constructed from medium grain porous graphite having a sealant, a heat resistant coating applied to selected portions of said delivery member; to provide a plurality of outlets through said delivery member to provide passages from said bore through a wall of said delivery member;

means to provide for connection of said delivery member to a gas supply source; and a gas supply source.

12. The apparatus of claim 10 further including means to cool the delivery member.

13. The apparatus of claim 11 wherein the delivery member is connected to a feeder pipe to comprise a manifold and wherein the delivery member has a cooling jacket through which the delivery member passes so as to cool the delivery member.

14. In a method of making a flat glass ribbon by a float process wherein molten glass is delivered onto a pool of molten metal containing tin within an enclosed chamber and formed into a glass ribbon, the glass ribbon having opposed edges as it moves through the chamber in a predetermined direction with the edges of the ribbon spaced from walls of the enclosed chamber such that the space between the edge of the ribbon and the adjacent wall of the chamber defines an uncovered portion of the pool of molten metal, wherein oxygen gas dissolved in the pool of molten metal combines with the tin in the molten metal to form tin oxide which vaporizes and collects within the chamber above the molten glass and glass ribbon resulting in defects in the glass ribbon, the improvement comprising:

positioning within the enclosed chamber an elongated porous member having a longitudinal axis and an elongated hollow passageway extending through the elongated member so that the member is submerged in the pool of molten metal in the space between the edge of the glass ribbon and the adjacent wall of the chamber such that the longitudinal axis of the elongated porous member generally parallels an adjacent edge of the glass ribbon and extends along the predetermined direction of the glass ribbon, wherein gas passing into the passageway flows through the elongated porous member into the pool of molten metal and is concentrated away from the glass ribbon so as to avoid trapping the gas beneath the glass ribbon; and moving hydrogen gas through the passageway and the elongated porous member directly into the pool of molten metal at a rate of about 3 to 20 standard cubic feet of hydrogen per hour per ton of tin within the molten metal to react the hydrogen with the tin oxide within the pool of molten metal to form water and elemental tin to reduce the amount of tin oxide within the pool of molten metal.

15. In a method of making a flat glass ribbon by a float process wherein molten glass is delivered onto a pool of molten metal containing tin within an enclosed chamber and formed into a glass ribbon, the glass ribbon having opposed edges as it moves through the chamber in a predetermined direction with the edges of the ribbon spaced from walls of the enclosed chamber such that the space between the edge of the ribbon and the adjacent wall of the chamber defines an uncovered portion of the pool of molten metal, wherein oxygen gas dissolved in the pool of molten metal combines with the tin in the pool of molten metal to form tin oxide which vaporizes and collects within the chamber above the molten glass and glass ribbon resulting in defects in the glass ribbon, the improvement comprising:

positioning an elongated porous member within the enclosed chamber in the pool of molten metal in the space between the edge of the glass ribbon and the adjacent wall of the chamber such that the elongated porous member generally parallels an adjacent edge of the glass ribbon and extends along the predetermined direction of the glass ribbon, the elongated porous member having: i) an elongated hollow passageway extending therethrough such that the hollow passageway extends generally parallel to the adjacent edge of the glass ribbon and along the predetermined direction of the glass ribbon, and ii) a non-porous heat resistant coating applied to selected portions of said elongated porous member for control of gas flow so that gas flowing into the passageway flows through the porous member into the pool of molten metal and is concentrated away from the glass ribbon so as to avoid trapping gas beneath the glass ribbon; and moving hydrogen gas through the passageway and the elongated porous member directly into the pool of molten metal to react the hydrogen with the tin oxide within the pool of molten metal to form water and elemental tin to reduce the amount of tin oxide within the pool of molten metal.

16. In a method of making a flat glass ribbon by a float process wherein molten glass is delivered onto a pool of molten metal containing tin within an enclosed chamber and formed into a glass ribbon, the glass ribbon having opposed edges as it moves through the chamber in a predetermined direction with the edges of the ribbon spaced from walls of the enclosed chamber such that the space between the edge of the ribbon and the adjacent wall of the chamber defines an uncovered portion of the pool of molten metal, wherein oxygen gas dissolved in the pool of molten metal combines with the tin in the pool of molten metal to form tin oxide which vaporizes and collects within the chamber above the molten glass and glass ribbon resulting in defects in the glass ribbon, the improvement comprising:

positioning within the enclosed chamber a non-porous delivery tube in the pool of molten metal in the space between the edge of the glass ribbon and the adjacent wall of the chamber such that the delivery tube generally parallels an adjacent edge of the glass ribbon and extends along the predetermined direction of the glass ribbon, wherein the delivery tube has a passageway extending therethrough such that the passageway extends generally parallel to the adjacent edge of the glass ribbon and along the predetermined direction of the glass ribbon;

providing a plurality of outlets along the delivery tube, wherein the outlets extend through a wall of the delivery tube such that gas passing into the passageway flows through the outlets and into the pool of molten metal; and moving hydrogen gas through the passageway and outlets directly into the pool of molten metal so that the gas is concentrated away from the glass ribbon so as to avoid trapping gas beneath the glass ribbon, whereby the gas can react with the tin oxide within the pool of molten metal to form water and elemental tin to reduce the amount of tin oxide within the pool of molten metal.

17. The method of claim 16 wherein hydrogen gas moves into the pool of molten metal at a rate of about 3 to 20 standard cubic feet of hydrogen gas per hour per ton of molten tin in the pool of molten metal.

18. The method of claim 16 further including a step of cooling the delivery tube.

19. The method of claim 16 wherein said positioning step includes the steps of placing the delivery tube in the pool of molten metal at a location outboard of an edge of the glass ribbon in the uncovered portion of the pool of molten metal, and repeating said placing step at selected positions on each side of the enclosed chamber to provide a plurality of delivery tubes in spaced relationship to one another along each side of the glass ribbon and extending along at least selected portions of the edges of the glass ribbon.

20. The method of claim 16 wherein the hydrogen gas is introduced into the pool of molten metal at a rate such that the hydrogen gas forms bubbles up to about 0.125 inches in diameter.

21. The apparatus of claim 10 wherein the delivery member is a delivery tube.

22. An apparatus for delivering gas within a pool of molten metal containing tin comprising;

a manifold having:
  feeder tube,
  connector for the feeder tube, wherein any porous portions of the feeder tube and connector are coated with a sealant to prevent diffusion of hydrogen gas therefrom;
  a heat resistant elongated, heat resistant delivery member for submersion in the molten metal connected in gas supply relation with the connector and feeder tube for submersion having a bore extending along at least a portion of said delivery member, and a heat resistant coating applied to selected portions of said delivery member;
  a plurality of outlets along said delivery member to provide passages from said bore through the outlets of said delivery member; and
means to provide for connection of said delivery member to a gas source.

23. The apparatus of claim 10 wherein the gas source is a pressurized hydrogen gas source.

* * * * *